United States Patent [19]

Biaggi et al.

[11] 4,324,878

[45] Apr. 13, 1982

[54] PRODUCTION OF VINYL CHLORIDE POLYMER

[75] Inventors: Roberto Biaggi; Massimo Quintini, both of Bergamo, Italy

[73] Assignee: Sigma Italiana Prodotti Chimici S.p.A., Bergamo, Italy

[21] Appl. No.: 103,339

[22] Filed: Dec. 13, 1979

[30] Foreign Application Priority Data

Dec. 15, 1978 [IT]  Italy .................. 30911 A/78

[51] Int. Cl.³ .................................................. C08F 2/20
[52] U.S. Cl. .................................. 526/200; 526/202; 526/203; 526/344.2
[58] Field of Search ................ 526/199, 200, 202, 203

[56] References Cited

U.S. PATENT DOCUMENTS 4,143,224  3/1979  Klippert ............................. 526/200
4,152,500  5/1979  Foschi ................................. 526/74
4,182,819  1/1980  Bauer ................................. 526/202

FOREIGN PATENT DOCUMENTS 830939  3/1960  United Kingdom ............... 526/202

*Primary Examiner*—C. A. Henderson
*Attorney, Agent, or Firm*—Stevens, Davis, Miller & Mosher

[57] ABSTRACT

A process for producing vinyl chloride polymer which comprises polymerizing vinyl chloride monomer in aqueous suspension, in the presence of a free radical catalyst, a primary suspending agent apt to control the granulometric distribution of the particles of PVC obtained, as well as a secondary suspending agent consisting of partially hydrolyzed polyvinyl acetate having a saponification number between 520 and 600 and a viscosity, measured in a 4% methanol solution at 20° C., between 0.5 and 2 cps.

6 Claims, No Drawings

4,324,878

PRODUCTION OF VINYL CHLORIDE POLYMER

BACKGROUND OF THE INVENTION

The present invention relates to a process for the aqueous suspension polymerization of vinyl chloride monomer (VCM), this being one of the most widely known and used methods for producing vinyl chloride polymers (PVC).

The method usually involves mixing liquid VCM with water and with an initiator of free radical polymerization, while the monomer itself is kept in dispersion by stirring at a high temperature, until polymerization has been obtained to the desired degree of conversion.

As widely known, it is most important to obtain a PVC having:
besides high porosity of the granules,
a rather uniform granulometric distribution, that is to say, a minimum quantity of too small or too large particles, or none at all.

The importance of obtaining high porosity of the granules derives not only from technical requirements—such as that for the granules to absorb plasticizers rapidly and in great quantity for forming "dry blends"—but also from health reasons, in that it has been noticed that only with highly porous granules is it possible to obtain a more thorough removal of the VCM residues, which have proved to be carcinogenic.

The importance of obtaining a rather uniform granulometric distribution derives essentially from technical requirements, particularly those of the subsequent working stages, for the production of finished or semi-finished products.

The combination of the two aforespecified characteristics, though having been notoriously desirable for a long time, is not easy to obtain, even if the specialized literature describes various processes for carrying out polymerization in such a way as to achieve this object.

This problem, as yet unsolved on an industrial scale, is particularly acute in the case of polymerization in reactors equipped with turbine stirrers.

As described in U.S. Pat. No. 3,772,226, the properties of the PVC obtained are influenced by different variables, depending on the technique used for suspension polymerization. As evidenced in this patent, the porosity of the polymer granules tends to clearly diminish if polymerization is carried on up to more than 90% of monomer conversion; hence, the known processes of suspension polimerization are interrupted at about 85% of the monomer conversion.

As described in the same U.S. Pat. No. 3,772,226, it is known that the use of suspending agents, in suspension polymerization, may notably influence the characteristics of the polymer obtained: whereby a great variety of substances, generally hydrosoluble, have been suggested for this purpose.

It has also been proposed to use a combination of "primary" and "secondary" or "auxiliary" suspending agents, in order to obtain an acceptable compromise between porosity and size of the particles. It is known that the "primary" suspending agents act as regulators of the particle size: they are usually hydrosoluble substances, such as cellulose or gelatin derivatives, polyvinyl alcohols, maleic anhydride/vinyl acetate copolymers, and others. The "secondary" suspending agents, which have been used with the intention of increasing the porosity of the granules, comprise partial esters of fatty acids with polyalcohols, monoglycerides of unsaturated fatty acids, polyethylene glycol esters, polysaccharides, and others.

In order to reduce the negative effect—on the granulometric uniformity of the particles—of the secondary suspending agents, it has been proposed to add other ingredients, as for example aliphatic alcohols and acids, acting as surfactants apt to control the monomer spreading coefficient on water (see for example Italian Pat. No. 674.764), or an exactly proportioned mixture of primary suspending agents, emulsifying agents (chiefly anionic) and inorganic coagulants (as described in the Italian Pat. No. 562.180).

A substantial improvement on the known technique has been obtained by means of the process according to our pending application U.S. Ser. No. 115,376 filed Jan. 28, 1980 now abandoned, in which it has been proposed to use the combination of a conventional suspending agent with a secondary suspending agent consisting of partially hydrolyzed polyvinyl acetate, having a saponification number between 300 and 500. This allows one to obtain the twofold advantage of being able to carry out polymerization with monomer conversion up to 93% and, at the same time, to keep the porosity of the granules at excellent values, and hence with very little VCM residues in the final product.

Since this important result was our chief object—in connection with the aforementioned health problems—less importance was given to the fact that the use of the specified secondary suspending agent led to the production of a polymer with rather wide granulometric distribution and, in particular, with an undesired increase in the percentage of the finer particles.

SUMMARY OF THE INVENTION

The object of the present invention is now to provide a process for the aqueous suspension polymerization of VCM, allowing one to keep the excellent characteristics of porosity already described in the cited application U.S. Ser. No. 115,376—particularly with monomer conversion up to 93%—but accomplishing at the same time also a very uniform granulometric distribution, particularly within the desired range of 75 to 160 microns.

This result is obtained by means of the process according to the present invention, which is still of the type wherein use is made of a primary and of a secondary suspending agent, this latter consisting of partially hydrolized polyvinyl acetate having a saponification number between 520 and 600, and perferably between 520 and 540, and a viscosity—measured in a 4% methanol solution at 20° C.—between 0.5 and 2 cps.

In actual fact, we have noticed—when carrying out researches in connection with partially hydrolyzed polyvinyl acetate—that the limits specified by preference in the pending appln. U.S. Ser. No. 115,376—namely a polyvinyl acetate being partially hydrolyzed so as to have a saponification number between 380 and 480—were not very critical and that for example for a PVC with K=70, there was no considerable worsening in the results even if reaching the specified top limit of the saponification number, i.e. 500.

In carrying on our studies, we have now discovered that, even if exceeding these limits—particularly up to a saponification number of 600—the final result, for what concerns the porosity of the grains, remains practically constant, while it has surprisingly been possible to establish that there is considerable improvement in the results—especially in the preferred range of partial hydrolysis, with saponification number between 520 and 540—with regard to the uniformity in the granulometric distribution of the particles of the final product.

More specifically, it was found that by using a polyvinyl acetate with a saponification number between 520 and 600, this does not interfere and therefore does not alter the action of the primary suspending agent—for example hydrosoluble polyvinyl alcohol and/or hydrosoluble modified cellulose—aiming at obtaining a proper and uniform granulometric distribution of the particles of the final PVC.

In actual fact, in producing for example a PVC with K=60–63, it was surprisingly found that there is even a general improvement in the results, both with regard to the porosity of the grains, and with regard to the granulometric distribution.

Though the reasons for this substantial improvement are not fully understood, it can be observed that the secondary suspending agent proposed by the present invention—namely having a saponification number between 520 and 600—is less soluble in water and more soluble in the VCM than the secondary suspending agent proposed in the pending application U.S. Ser. No. 115,376, namely polyvinyl acetate hydrolyzed to a saponification number between 300 and 500.

The excellent results obtained with the process according to the present invention can be obtained with any type of stirrer, both of the Pfaudler and of the turbine type, with or without breakwater, and with any type of catalyst commonly used in the polymerization of VCM. Hence, also in this respect, the process according to the present invention is particularly advantageous, in that it is not critical relatively to the working system applied on the industrial scale.

The partially hydrolyzed polyvinyl acetate used in the process according to the invention, may be obtained with any system known to the skilled in the art, for example with the system described in the Encyclopaedia of Chemical Technology (Kirk Othmer) Vol. 21, page 360, second edition.

The partially hydrolyzed polyvinyl acetate is normally obtained in a solution of solvents, such as methyl alcohol, ethyl alcohol, acetone, methyl acetate, ethyl acetate, or mixtures thereof, and can be added in the polymerization reaction either dissolved in said solvents or as an emulsion or suspension in water, or even in a solid form after separation from the solvents.

The amount of partially hydrolyzed polyvinyl acetate being used in the process according to the invention may vary from 0.01 to about 0.1%, and preferably between 0.02 and 0.06% by weight, calculated on the weight of VCM.

The amount of primary suspending agent may in turn vary within the same limits—besides, as known in common technique—and precisely from 0.01 to 0.1%, and preferably between 0.02 and 0.06% by weight, calculated on the weight of VCM. The weight proportion between primary suspending agent and secondary suspending agent may vary within a wide range from 1:10 to 10:1.

The initiators of free radical polymerization being used are also the common ones, and they comprise for example benzoyl peroxide, lauroyl peroxide, azodiisobutyronitrile, and others. These catalysts can be used in a proportion of about 0.01 to 0.5% by weight calculated on the weight of VCM.

The temperature may vary, but it is generally between 50° and 70° C., and preferably between 55° and 65° C.

As already specified above, polymerization can be carried out up to a 93% conversion of the monomer, without decreasing the porosity of the grains. Such porosity—expressed in cc/g and measured with a mercury porosity meter according to the method C.ERBA—stays at the optimum level of 0.25–0.26 cc/g for a PVC with K=60–63, or 0.38 cc/g for a PVC with K=70. Similar results are obtained with vinyl chloride polymers having a different K.

The aforedescribed process allows one moreover to obtain, as already specified, a PVC in particles having a uniform granulometric distribution and, in particular, a product containing no more than 3% of granules having dimensions below 75 microns.

The annexed tables show in detail the characteristics of the PVC which can be obtained with the process according to the present invention. The tables report the data of different tests carried out on a PVC with K=63 (Table I) and, respectively, on a PVC with K=70 (Table II); the different tests are divided into groups A, B, C and D, referring to the following examples 1, 2, 3 and 4 respectively, the difference between the various tests lying only in the different choice of the suspending agents used.

EXAMPLE 1

The VCM is aqueous suspension polymerized into a 5 cu. m. reactor equipped with a Pfaudler stirrer. The reactor is charged with:

2,400 kg demineralized water
1,600 kg vinyl chloride monomer (VCM)
2.55 kg lauroyl peroxide The quantities and the types of suspending agents used are indicated in Table I, group A.

The mixture is heated at 61° C. while being stirred at 115 r.p.m. in the closed reactor, up to obtaining a monomer conversion in the polymer not below 93%, which is evidenced through a decrease in pressure of 3.5 atm.

EXAMPLE 2

The VCM is aqueous suspension polymerized into a 5 cu. m. reactor equipped with a turbine stirrer. The reactor is charged with:

2,400 kg demineralized water
1,600 kg vinyl chloride monomer (VCM)
2.55 kg lauroyl peroxide The quantities and the types of suspending agents used are indicated in Tables I, group B.

The mixture is heated at 61° C. while being stirred at 150 r.p.m. in the closed reactor, up to obtaining a monomer conversion not below 93%, which is evidenced through a decrease in pressure of 3.5 atm.

EXAMPLE 3

The VCM is aqueous suspension polymerized into a 5 cu. m. reactor equipped with a Pfaudler stirrer. The reactor is charged with:

2,400 kg demineralized water
1,600 kg vinyl chloride monomer (VCM)
2.55 kg lauroyl peroxide The quantities and the types of suspending agents used are indicated in Table II, group C.

The mixture is heated at 55° C. while being stirred at 130 r.p.m. in the closed reactor, up to obtaining a monomer conversion not below 93%, which is evidenced through a decrease in pressure of about 3.5 atm.

EXAMPLE 4

The VCM is aqueous suspension polymerized into a 5 cu. m. reactor equipped with a turbine stirrer. The reactor is charged with:

2,400 kg demineralized water
1,600 kg vinyl chloride monomer (VCM)
2.55 kg lauroyl peroxide The quantities and the types of suspending agents used are indicated in Table II, group D.

The mixture is heated at 55° C. while being stirred at 150 r.p.m. in the closed reactor, up to obtaining a monomer conversion not below 93%, which is evidenced through a decrease in pressure of about 3.5 atm.

TABLE I

| | GROUP A K = 63 – Pfaudler stirrer | | | | | | | | | GROUP B K = 63 – Turbine stirrer | | | | | | | | |
|---|---|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 | 8 | 9 |
| (1) Vinyl chloride monomer | 100 | 100 | 100 | 100 | 100 | 100 | 100 | 100 | 100 | 100 | 100 | 100 | 100 | 100 | 100 | 100 | 100 | 100 |
| (2) Demineralized water | 150 | 150 | 150 | 150 | 150 | 150 | 150 | 150 | 150 | 150 | 150 | 150 | 150 | 150 | 150 | 150 | 150 | 150 |
| (3) Lauroyl peroxide | 0.16 | 0.16 | 0.16 | 0.16 | 0.16 | 0.16 | 0.16 | 0.16 | 0.16 | 0.16 | 0.16 | 0.16 | 0.16 | 0.16 | 0.16 | 0.16 | 0.16 | 0.16 |
| (4) Methyl hydroxypropyl cellulose | 0.06 | 0.04 | 0.03 | 0.04 | — | 0.03 | 0.04 | — | 0.06 | 0.06 | 0.04 | 0.03 | 0.04 | — | 0.03 | 0.04 | — | 0.06 |
| (5) Water-soluble polyvinyl alcohol (saponification number: 140) | — | — | — | 0.04 | 0.06 | — | 0.04 | 0.06 | — | — | — | — | 0.04 | 0.06 | — | 0.04 | 0.06 | — |
| (6) Polyvinyl alcohol (saponification number: 315) | — | 0.06 | 0.04 | — | 0.04 | 0.04 | — | 0.04 | — | — | 0.06 | 0.04 | — | 0.04 | 0.04 | — | 0.04 | — |
| (7) Sorbitol monostearate | 0.20 | — | — | — | — | — | — | — | — | 0.20 | — | — | — | — | — | — | — | — |
| (8) Polyvinyl acetate with saponification number 450 (according to application Ser. No. 115,376) | — | — | 0.04 | 0.04 | 0.04 | — | — | — | — | — | — | 0.04 | 0.04 | 0.04 | — | — | — | — |
| (9) Polyvinyl acetate with saponification number 525 (according to present invention) | — | — | — | — | — | 0.04 | 0.04 | 0.04 | 0.04 | — | — | — | — | — | 0.04 | 0.04 | 0.04 | 0.04 |
| (10) Polymerization temperatures, °C. | 61 | 61 | 61 | 61 | 61 | 61 | 61 | 61 | 61 | 61 | 61 | 61 | 61 | 61 | 61 | 61 | 61 | 61 |
| (11) Δ P degrees at the end of the reaction, atmospheres | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 |
| (12) Monomer conversion, % | 93 | 93 | 93 | 93 | 93 | 93 | 93 | 93 | 93 | 93 | 93 | 93 | 93 | 93 | 93 | 93 | 93 | 93 |
| GRANULOMETRIC DISTRIBUTION, %: | | | | | | | | | | | | | | | | | | |
| (13) - residue on 60 mesh (250 μ) | traces | tr. | tr. | tr. | tr. | tr. | tr. | tr. | tr. | tr. | tr. | tr. | tr. | tr. | tr. | tr. | tr. | tr. |
| (14) - residue on 80 mesh (177 μ) | 2 | 1 | 1 | 0 | 0 | 1 | 1 | 1 | 1 | tr. | 1 | 0 | 0 | 0 | 1 | 1 | 1 | 1 |
| (15) - residue on 140 mesh (105 μ) | 50 | 62 | 51 | 45 | 47 | 65 | 63 | 67 | 46 | 42 | 48 | 46 | 44 | 42 | 59 | 60 | 58 | 44 |
| (16) - residue on 200 mesh (75 μ) | 30 | 32 | 36 | 40 | 40 | 32 | 33 | 30 | 50 | 32 | 44 | 38 | 40 | 43 | 36 | 36 | 38 | 52 |
| (17) - final residue (less than 75 μ) | 18 | 5 | 12 | 15 | 13 | 2 | 3 | 2 | 3 | 26 | 7 | 16 | 16 | 15 | 3 | 3 | 3 | 3 |
| (18) Bulk density, g/cc | 0.530 | 0.540 | 0.520 | 0.520 | 0.510 | 0.515 | 0.515 | 0.515 | 0.515 | 0.530 | 0.540 | 0.525 | 0.525 | 0.525 | 0.520 | 0.520 | 0.520 | 0.520 |
| (19) Porosity, cc/g (Carlo Erba method) | 0.17 | 0.21 | 0.25 | 0.25 | 0.25 | 0.26 | 0.26 | 0.26 | 0.26 | 0.17 | 0.21 | 0.25 | 0.25 | 0.25 | 0.26 | 0.26 | 0.26 | 0.26 |
| (20) Vinyl chloride monomer residue in the slurry, p.p.m. (1) | 350 | 150 | <30 | <30 | <30 | <25 | <25 | <25 | <25 | 350 | 150 | <30 | <30 | <30 | <25 | <25 | <25 | <25 |
| (21) Vinyl chloride monomer residue in the PVC after drying, p.p.m. | 110 | 75 | <5 | <5 | <5 | <5 | <5 | <5 | <5 | 110 | 75 | <5 | <5 | <5 | <5 | <5 | <5 | <5 |
| (22) Fish-eyes with Mill Roll (2) | 40 | <20 | <10 | <10 | <10 | <10 | <10 | <10 | <10 | 35 | 20 | <10 | <10 | <10 | <10 | <10 | <10 | <10 |

(1) As measured after stripping of the reactor at 75° C., for 90 minutes, at 0.65 atm.
(2) Resulting on film calendered at 150/160° C., 0.2 mm thick, after 5 minutes.

TABLE II

| | GROUP C $K = 70$ – Pfaudler stirrer | | | | | | | | | GROUP D $K = 70$ – Turbine stirrer | | | | | | | | |
|---|---|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 | 8 | 9 |
| (1) Vinyl chloride monomer | 100 | 100 | 100 | 100 | 100 | 100 | 100 | 100 | 100 | 100 | 100 | 100 | 100 | 100 | 100 | 100 | 100 | 100 |
| (2) Demineralized water | 150 | 150 | 150 | 150 | 150 | 150 | 150 | 150 | 150 | 150 | 150 | 150 | 150 | 150 | 150 | 150 | 150 | 150 |
| (3) Lauroyl peroxide | 0.16 | 0.16 | 0.16 | 0.16 | 0.16 | 0.16 | 0.16 | 0.16 | 0.16 | 0.16 | 0.16 | 0.16 | 0.16 | 0.16 | 0.16 | 0.16 | 0.16 | 0.16 |
| (4) Methyl hydroxypropyl cellulose | 0.08 | 0.06 | 0.08 | 0.04 | — | 0.06 | 0.04 | — | 0.08 | 0.08 | 0.06 | 0.08 | 0.06 | 0.16 | 0.06 | 0.04 | — | 0.08 |
| (5) Water-soluble polyvinyl alcohol (saponification number: 140) | — | — | — | — | 0.10 | — | 0.06 | 0.10 | — | — | 0.10 | — | — | 0.10 | — | 0.06 | 0.10 | — |
| (6) Polyvinyl alcohol (saponification number: 315) | — | 0.10 | — | 0.06 | 0.04 | 0.06 | — | 0.04 | — | — | — | — | 0.06 | 0.04 | 0.06 | — | 0.04 | — |
| (7) Sorbitol monostearate | 0.20 | — | — | — | — | — | — | — | — | 0.20 | — | — | — | — | — | — | — | — |
| (8) Polyvinyl acetate with saponification number 450 (according to application Ser. No. 115,376) | — | — | 0.08 | 0.08 | 0.08 | — | — | — | — | — | — | 0.08 | 0.08 | 0.08 | — | — | — | — |
| (9) Polyvinyl acetate with saponification number 525 (according to present invention) | — | — | — | — | — | — | — | — | 0.08 | — | — | — | — | — | — | — | — | 0.08 |
| (10) Polymerization temperatures, °C. | 55 | 55 | 55 | 55 | 55 | 55 | 55 | 55 | 55 | 55 | 55 | 55 | 55 | 55 | 55 | 55 | 55 | 55 |
| (11) Δ P degassing at the end of the reaction, atmospheres | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 |
| (12) Monomer conversion, % | 93 | 93 | 93 | 93 | 93 | 93 | 93 | 93 | 93 | 93 | 93 | 93 | 93 | 93 | 93 | 93 | 93 | 93 |
| GRANULOMETRIC DISTRIBUTION, %: | | | | | | | | | | | | | | | | | | |
| (13) - residue on 60 mesh (250 μ) | tr. | tr. | tr. | tr. | tr. | tr. | tr. | tr. | tr. | tr. | tr. | tr. | tr. | tr. | tr. | tr. | tr. | tr. |
| (14) - residue on 80 mesh (177 μ) | 6 | tr. | 1 | tr. | 0 | 1 | 2 | 2 | 2 | tr. | tr. | 0 | tr. | 0 | 2 | 1 | 1 | 2 |
| (15) - residue on 140 mesh (105 μ) | 53 | 55 | 52 | 51 | 55 | 62 | 67 | 60 | 63 | 40 | 35 | 47 | 43 | 46 | 60 | 59 | 61 | 56 |
| (16) - residue on 200 mesh (75 μ) | 26 | 30 | 37 | 41 | 33 | 34 | 30 | 33 | 32 | 30 | 55 | 39 | 45 | 42 | 35 | 35 | 35 | 37 |
| (17) - final residue (less than 75 μ) | 15 | 15 | 10 | 8 | 12 | 3 | 1 | 3 | 3 | 30 | 10 | 14 | 12 | 12 | 3 | 5 | 3 | 5 |
| (18) Bulk density, g/cc | 0.495 | 0.500 | 0.47 | 0.47 | 0.47 | 0.465 | 0.472 | 0.470 | 0.475 | 0.498 | 0.505 | 0.47 | 0.47 | 0.47 | 0.460 | 0.472 | 0.475 | 0.480 |
| (19) Porosity, cc/g (Carlo Erba method) | 0.28 | 0.30 | 0.38 | 0.38 | 0.38 | 0.38 | 0.38 | 0.38 | 0.38 | 0.28 | 0.30 | 0.38 | 0.38 | 0.38 | 0.38 | 0.38 | 0.38 | 0.38 |
| (20) Vinyl chloride monomer residue in the slurry, p.p.m. | 100 | 80 | <25 | <25 | <25 | <15 | <15 | <15 | <15 | 100 | 80 | <25 | <25 | <25 | <15 | <15 | <15 | <15 |
| (21) Vinyl chloride monomer residue in the PVC after drying, p.p.m.(1) | 50 | 45 | <5 | <5 | <5 | <5 | <5 | <5 | <5 | 50 | 45 | <5 | <5 | <5 | <5 | <5 | <5 | <5 |
| (22) Fish-eyes with Mill Roll(2) | 25 | 20 | 6 | 4 | 5 | 3 | 7 | 2 | 7 | 25 | 20 | 5 | 5 | 3 | 5 | 4 | 6 | 5 |

(1) As measured after stripping of the reactor at 75° C., for 90 minutes, at 0.65 atm.
(2) Resulting on film calendered at 150/160° C., 0.2 mm thick, after 5 minutes.

When interpreting the data reported in Tables I and II, one must bear in mind that:

the data contained in column 1 of each of the groups, A, B, C or D, relate to tests carried out on PVC obtained according to techniques known per se, paticularly by using s orbitol monostearate as the secondary suspending agent;

the data contained in column 2 of each of the groups A, B, C or D, relate to a PVC obtained by using, as the secondary suspending agent, polyvinyl alcohol having a saponification number of 315, that is, close to the lower margin of the range specified in application Ser. No. 890,503. It can be observed that the results are already better than those obtained according to the known technique, but much inferior to those which can be obtained according to the present invention;

the data contained in columns 3 to 5, refer instead to tests carried out on PVC obtained by using, among the secondary suspending agents, also partially hydrolized polyvinyl acetate having a saponification number of 450, namely within the preferred range specified in application Ser. No. 115,376, pending;

finally, the data contained in columns 6 to 9, refer to tests carried out on PVC obtained according to the teachings of the present invention, that is, by using—as the secondary suspending agent—partially hydrolized polyvinyl acetate having a saponification number of 525.

The first remark relates to the comparison between the data contained in column 1 and the remaining data. It can be seen quite evidently that the PVC obtained according to the known technique has—compared to the PVC obtained according to application Ser. No. 115,376 or according to the present invention—a markedly lower porosity and, hence, a higher bulk density, but above all, a high amount of monomer residue both in the slurry and in the dry PVC.

On comparing subsequently the data contained in columns 3 to 5 with those contained in columns 6 to 9, two kinds of considerations can be made:

(a) first of all it can be observed that the data referring to the porosity and to the presence of monomer residue are substantially equivalent; in particular, there is even an improvement in the data if referring to a VCP with K=63 (see Table I).

(b) furthermore, one notes a clear improvement in the granulometric distribution, with a reduction below significant values of the amount of particles below 75 microns and of that above 170 microns, and with a simultaneous concentration of most of the granules around the preferred dimension of 100 micron.

It is anyhow understood that the invention is not limited to the particular examples described or illustrated in the annexed tables, but that there may be many other preparations differing from the same, by simply modifying the primary suspending agents or by combining other known secondary suspending agents together with those of the present invention, all these variants being within reach of an expert in the art and falling anyhow within the protection scope of the present invention.

We claim:

1. A process for producing vinyl chloride polymer which comprises polymerizing vinyl chloride monomer in aqueous suspension, in the presence of a free radical catalyst, a primary suspending agent to control the granulometric distribution of the particles of vinyl chloride polymer obtained and selected from the group consisting of water-soluble polyvinyl alcohols, water-soluble modified celluloses, and water-soluble maleic anhydride/vinyl acetate copolymers, and a secondary suspending agent consisting of partially hydrolyzed polyvinyl acetate having a saponification number between 520 and 600 and a viscosity, measured in a 4% methanol solution at 20° C., between 0.5 and 2 cps wherein the ratio of the amount of said primary suspending agent to the amount of said secondary suspending agent is between 1:10 and 10:1.

2. A process according to claim 1, wherein the said secondary suspending agent consists of partially hydrolyzed polyvinyl acetate, having a saponification number between 520 and 540.

3. A process according to claim 1, wherein the amount of partially hydrolyzed polyvinyl acetate being employed is from 0.01% to 0.1% by weight, calculated on the weight of monomer used.

4. A process according to claim 1, wherein the amount of partially hydrolyzed polyvinyl acetate being employed is from 0.02 to 0.06% by weight, calculated on the weight of monomer used.

5. A process according to claim 1, wherein the said primary suspending agent is methyl cellulose or methyl hydroxycellulose.

6. A process according to claims 1, 2, 3, 4 or 5 wherein there is produced PVC with K=63.

* * * * *